United States Patent [19]

Ervin et al.

[11] 4,183,384

[45] Jan. 15, 1980

[54] PROCESS AND APPARATUS FOR BLENDING FLUIDS TO MAINTAIN CONCENTRATION OF ONE BELOW A PREDETERMINED MAXIMUM

[75] Inventors: Eugene D. Ervin, Wescosville; Frederick K. Kitson, Kutztown; David M. Krasiewich, Allentown; Thomas E. McWhorter, Whitehall, all of Pa.

[73] Assignee: Air Products and Chemicals, Inc., Allentown, Pa.

[21] Appl. No.: 870,553

[22] Filed: Jan. 18, 1978

[51] Int. Cl.[2] .......... B65B 3/04

[52] U.S. Cl. .......... 14/19; 137/98; 222/1; 222/59; 222/145

[58] Field of Search .......... 222/1, 57, 59, 133, 222/134, 135, 145; 141/105, 9; 137/88, 98

[56] References Cited

U.S. PATENT DOCUMENTS

| | | | |
|---|---|---|---|
| 1,573,079 | 2/1926 | McKee | 137/98 X |
| 2,255,787 | 9/1941 | Kendrick | 137/98 X |
| 2,583,986 | 1/1952 | Bahnson, Jr. | 137/98 |
| 3,123,252 | 3/1964 | Kuntz | 222/1 |
| 3,225,962 | 12/1965 | Loebeck | 222/1 |
| 3,298,383 | 1/1967 | Cooper | 222/134 X |

*Primary Examiner*—David A. Scherbel
*Assistant Examiner*—Fred A. Silverberg
*Attorney, Agent, or Firm*—Thomas G. Ryder; H. Barry Moyerman; E. Eugene Innis

[57] ABSTRACT

A safety apparatus for use in fluid blending and dispensing devices wherein it is essential to insure that one of the fluids to be blended be maintained below a defined maximum concentration. The apparatus comprises a single valve located in the inlet line of the fluid to be controlled, which is operable upon detection of an increase in the flow rate of the fluid to be controlled or by a decrease in the flow rate of any of the other fluids with which it is being blended.

10 Claims, 3 Drawing Figures

PROCESS AND APPARATUS FOR BLENDING FLUIDS TO MAINTAIN CONCENTRATION OF ONE BELOW A PREDETERMINED MAXIMUM

BACKGROUND OF THE INVENTION

In many operations employing a mixture of fluids, it is important to insure that the concentration of one of the fluids be maintained below a particular level. Illustrative of such a situation is the employment of a mixture of carbon monoxide and nitrogen gases as a medium for preserving certain foodstuffs while in transit. It has previously been suggested to introduce the nitrogen and the carbon monoxide separately into the shipping container, such as for example, the cargo compartment of a vehicle. Typically, the shipping container is first loaded with foodstuffs and then the carbon monoxide and nitrogen are introduced to replace the air in the container. The introduction of carbon monoxide directly into air is obviously a risky operation. Even when an effort is made to sweep the air from the containers, such as, for example, by a nitrogen purge, prior to introduction of carbon monoxide, it is still possible for isolated pockets of air to be present within the confined spaces of the container into which pure carbon monoxide is being injected. Such procedures make it possible for explosive mixtures of carbon monoxide and air to exist and, in fact, several explosions have occurred.

This particular type of problem is solved through the present invention by the method of blending the carbon monoxide and nitrogen together outside of the container before dispensing the mixture into the shipping container, thereby avoiding the dangerous practice of introducing pure carbon monoxide directly. Additionally, the present invention functions to insure that the carbon monoxide content in the mixture with nitrogen is maintained at a level below that at which carbon monoxide could form an explosive mixture with air.

While techniques are available for analyzing and detecting the compositions of fluid mixtures which can be operable to adjust the proportions of the components of the mixture to insure maintenance of a desired composition of the mixture, many of such procedures are time consuming and in other instances, the apparatus required to effect such control is quite cumbersome. Accordingly, the need has been felt in the art for a simple procedure, capable of being implemented by inexpensive and compact apparatus, which will assure prevention of the formation of dangerous concentrations of a component in a mixture.

SUMMARY OF THE INVENTION

The technique of this invention functions to prevent the formation of a dangerous or undesired mixture of fluids by preblending the fluids prior to employment so as to insure the prevention of formation of a mixture of the fluids wherein the concentration of one of the fluid components is greater than a predetermined maximum value. The procedure requires the employment of techniques for the detection of the flow rate in the inlet line for the critical fluid and techniques for detecting flow as well as the flow rate in the inlet lines for all other fluids to be blended and interrupting flow of the critical fluid when increase in flow rate of the critical fluid is detected or a decrease in the flow rate or no-flow of any of the other fluids of the blend is detected.

As will be understood, this invention is operable in any system requiring the blending of a critical fluid with one or more other fluids. The rationale of operation is to detect either (or both) of the two types of perturbations which could give rise to an increase in the concentration of the critical fluid in the combined mixture. One of these is an increase in the flow of the critical fluid itself, which would result in an increase in total quantity and thus concentration of the critical fluid in the combined mixture. The other of these is a reduction in the flow rate of any other fluid which by a reduction of its quantity in the mixture results in the potential increase in the concentration of all other fluids, including the critical fluid, in the mixture.

While this invention is operable generally in any situation where it is desired to avoid the formation of a mixture in which the concentration of a critical component is above a predetermined maximum, the invention is particularly well suited to those situations where failure to maintain the component below the predetermined maximum concentration causes severe or, perhaps, even irreparable damage. An example of one such situation was mentioned previously in the form of the creation of an explosive mixture of carbon monoxide and air. Another situation occurs when concentrated mineral acid is added to sewage plant effluent to control its pH prior to introduction into a holding pond. In this situation it is much more important to prevent the holding pond from becoming too acidic than it is to operate temporarily at a low concentration of acid. It will be seen that this invention is eminently suited to prevent an increase in acid flow or to prevent acid flow in the event of a decrease in plant effluent flow. As mentioned earlier, the apparatus embodying the present invention is simple, compact and easily transportable.

In order to described the apparatus more clearly, reference is made to the attached drawings illustrating the apparatus of this invention.

DESCRIPTION OF THE DRAWINGS

Referring now to FIG. 1, this apparatus for a two-component system will be described in connection with use in blending nitrogen and carbon monoxide prior to introduction into a vessel or a shipping container 15 for certain foodstuffs. Shown in this figure are nitrogen inlet line 10 and carbon monoxide inlet line 12. At the opposite end of FIG. 1 is an outlet line 14 into which the stream of lines 10 and 12 are combined. The principal components of the safety apparatus of this invention are encompassed within dotted line 16. Upstream of the main apparatus, both lines 10 and 12 are provided with ball valves 18 and 20, respectively. Immediately downstream of the main portion of the apparatus which is encompassed within dotted line 16 both lines 10 and 12 are also provided with check valves 22 and 24, respectively. Also downstream of the main portion of the safety apparatus and upstream of the point where lines 10 and 12 combine to form outlet line 14, the lines 10 and 12 are also provided with ball valves 26 and 28, respectively. As will be understood, the upstream ball valves 18 and 20 can be closed as can be downstream ball valves 26 and 28, thereby isolating the safety apparatus for purposes of making any adjustments that may be desired. Similarly, check valves 22 and 24 function to permit flow only in one direction, thereby preventing backflow of one stream or the combined stream into the line of the other stream.

Figure 1:
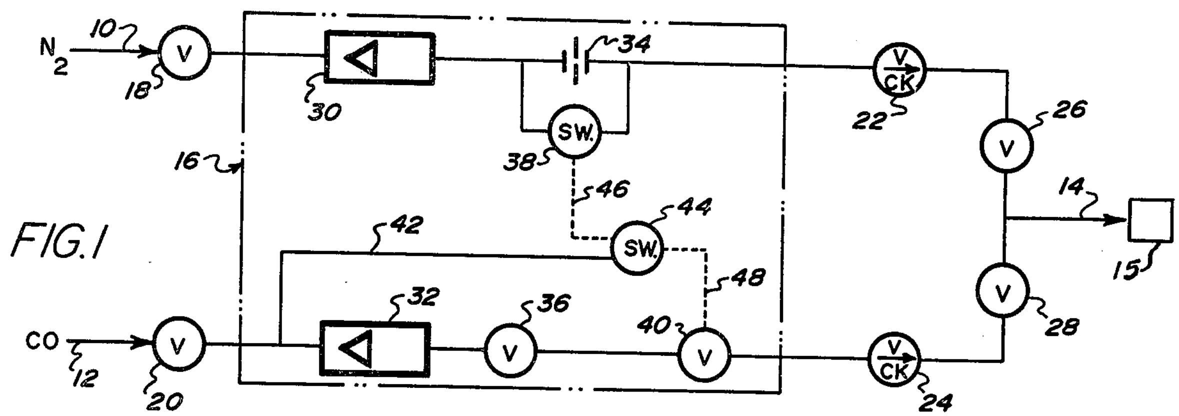
FIG. 1 is a schematic diagram of an apparatus embodying this invention for use in connection with a two-component system.

The main components of the safety apparatus of this invention enclosed within dotted line 16 include rotameters 30 and 32 positioned in lines 10 and 12, respectively. In line 10, downstream of rotameter 30, is an orifice plate assembly 34. In effect the flow rate through line 10 is predetermined by the size of the orifice in the plate employed in orifice plate assembly 34 and alteration of the flow rate at fixed pressure can only be accomplished by replacement of the orifice plate in assembly 34. Alternatively, flow rate can be varied by changing pressure in line 10, such as by use of valve 18, without changing the orifice plate. Positioned in line 12 downstream of rotameter 32 is an adjustable orifice valve 36 operable to control the rate of flow of carbon monoxide through line 12. Connected to line 10 at the upstream and downstream sides of assembly 34 is a differential pressure switch 38 which detects the pressure drop across orifice plate assembly 34 and is designed to be operable upon a decrease in the pressure differential across the assembly 34.

Referring now to the carbon monoxide line 12, there is shown a pneumatically operated valve 40 positioned in line 12 downstream of the adjustable orifice valve 36. A pressure sensing line 42 is also connected at one end thereof to line 12 at a point upstream of rotameter 32. The other end of pressure sensing line 42 is operably connected to a pressure switch 44.

The differential pressure switch 38 is connected to pressure switch 44 by means of pneumatic line 46 and pressure switch 44 is further connected to pneumatically-operated valve 40 by means of pneumatic line 48. This interconnection of differential pressure switch 38, pressure switch 44 and pneumatic valve 40 is operable to effect closing of valve 40 either upon detection of a decrease in pressure differential (including zero pressure differential) across assembly 34 or upon detection of an increase in pressure upstream of valve 36 by means of pressure sensing line 42.

As a practical matter, it is preferred that valve 40 have a normally closed position but be maintained in an open position as the result of positive signals from pressure switches 38 and 44. This provides an additional safety factor since valve 40 will close upon failure to receive a signal as well as a proper signal from either switch 38 or switch 44.

Through selection of a desired orifice plate for use in orifice plate assembly 34 the rate of flow of nitrogen through line 10 can be predetermined at a fixed upstream pressure. Similarly, through adjustment of orifice valve 36 the rate of flow of carbon monoxide through line 12 can also be predetermined at a fixed upstream pressure. In both instances, the rate of flow can also be established at different levels by setting the upstream pressure at different levels prior to operation, while retaining an orifice of fixed size.

Through the operation of the illustrated apparatus any variation in the quantity of material flowing through either lines 10 or 12 which would result in an increase in the concentration of the carbon monoxide of line 12 in the ultimate combined stream of line 14 will operate to close pneumatic valve 40; thereby preventing the formation of a mixture containing more than a predetermined maximum quantity of carbon monoxide.

It must be pointed out that the selection of the particular techniques for determining alterations in flow rate in lines 10 and 12 is also significant. In connection with controlling flow rate of the critical carbon monoxide fluid in line 12, an increase in pressure in the line upstream of orifice valve 36 is indicative of a potential increase in the rate of flow through the orifice. While it is possible that an increase in pressure in line 12 upstream of orifice valve 36 could be the result of back pressure caused by an inadvertant partial closing of orifice valve 36 or other partial or total downstream blockage of line 12, the philosophy of operation of this invention is to prevent flow through line 12 at any time there is a possibility of the introduction of an increased quantity of the stream of line 12 into combined stream 14.

A different method of detecting flow rate in line 10 is employed, i.e. the pressure differential across the orifice plate, because it is necessary to detect not only variations in flow rate of the stream of line 10 but also to detect whether there is or is not flow through line 10. Thus, for example, if only the pressure in line 10 upstream of the orifice plate assembly 34 were detected, it is possible that a decrease in such upstream pressure would be indicative of a decrease in flow through line 10. On the other hand, however, if the downstream ball valve 26 in line 10 were inadvertently to be closed, mere detection of constant or possibly slightly increased pressure in the line upstream of orifice plate assembly 34 would not indicate a no-flow situation in line 10 and, thus, would not result in closing of pneumatic valve 40. On the other hand, however, detecting a decrease in the pressure drop across assembly 34 is clearly indicative of a decrease in the flow rate through line 10. Further, detection of no pressure drop (i.e. zero pressure differential) across assembly 34 is indicative of a no-flow situation in line 10. In either of these latter situations valve 40 would be closed.

Figure 2:
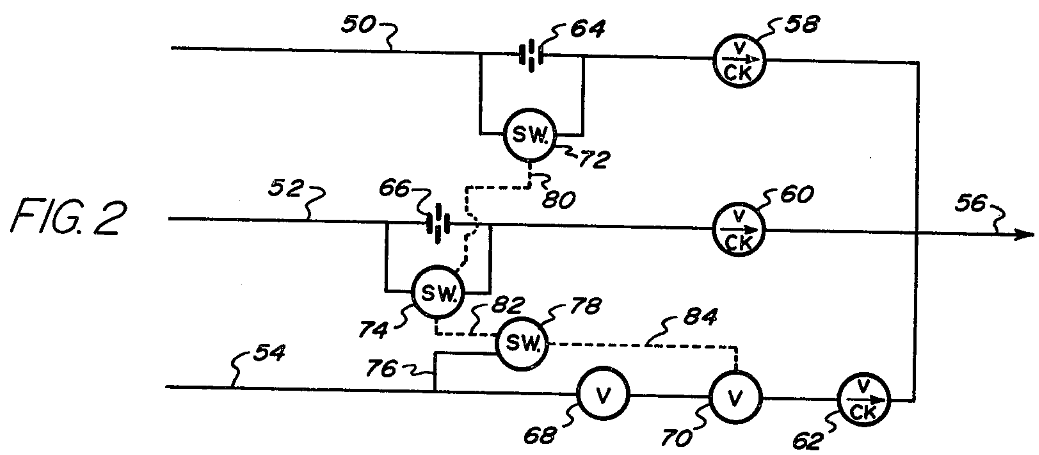
FIG. 2 is another schematic diagram of an apparatus in accordance with this invention suitable for employment with a three-component system.

Referring now to FIG. 2, there is illustrated an apparatus of this invention for use with a three-component system. In this figure the ball valves upstream and downstream of the apparatus are not illustrated, nor are rotameters 30 and 32. This is solely for purposes of simplifying the drawings. This figure, however, does show inlet lines 50 and 52 as well as inlet line 54 for the stream of the critical fluid. The streams of these three lines are combined into a single outlet line 56. Downstream of the apparatus of this invention are located three check valves 58, 60 and 62 located in lines 50, 52 and 54, respectively. As in the apparatus of FIG. 1, the check valves in the apparatus of FIG. 2 also function to permit flow only in one direction, thereby preventing backflow of one or more of the inlet streams or of the combined outlet stream into the line of any of the other streams.

Each of the lines 50 and 52 is provided with an orifice plate assembly 64 and 66, respectively. Thus the orifice plate assembly 64 controls and measures the rate of flow of fluid through line 50, while orifice plate 66 performs a similar function regarding the stream of line 52. The rate of flow of fluid through line 54 is controlled by means of an adjustable orifice valve 68 positioned in line 54. Also positioned in line 54 at a location downstream of adjustable orifice valve 68 is pneumatically operated valve 70.

Connected to line 50 at the upstream and downstream sides of orifice plate assembly 64 is a differential pressure switch 72 which detects the pressure drop across assembly 64 and is designed to be operable upon a decrease in pressure differential. Similarly, connected to line 52 at the upstream and downstream sides of orifice plate assembly 66 is another differential pressure switch 74 designed to be operable upon a decrease in pressure differential. A pressure sensing line 76 is connected at one end thereof to line 54 at a point upstream of adjustable orifice valve 68 for detecting the pressure in line 54 at this point. The other end of pressure sensing line 76 is operably connected to pressure switch 78.

The differential pressure switches 72 and 74 and pressure switch 78 are connected in series by means of pneumatic lines 80 (from 72 to 74) and 82 (74 to 78). Pressure switch 78 is in turn connected to pneumatically operated valve 70 by means of pneumatic line 84. This interconnection of differential pressure switches 72 and 74 and pressure switch 78 with pneumatically operated valve 70 is operable to effect closing of valve 70 either upon detection of a decrease in pressure differential (including zero pressure differential) across either assembly 64 or 66 or upon detection of an increase in pressure in line 54 upstream of valve 68. Thus, it will be seen, that at any time there is a risk of an increased rate of flow in line 54 or a decrease in flow or a no-flow condition in either of lines 50 or 52, valve 70 will operate to prevent further flow of the critical fluid through line 54 thereby precluding the possibility of an increase in concentration of the fluid of line 54 occurring in the combined mixture of line 56.

Figure 3:
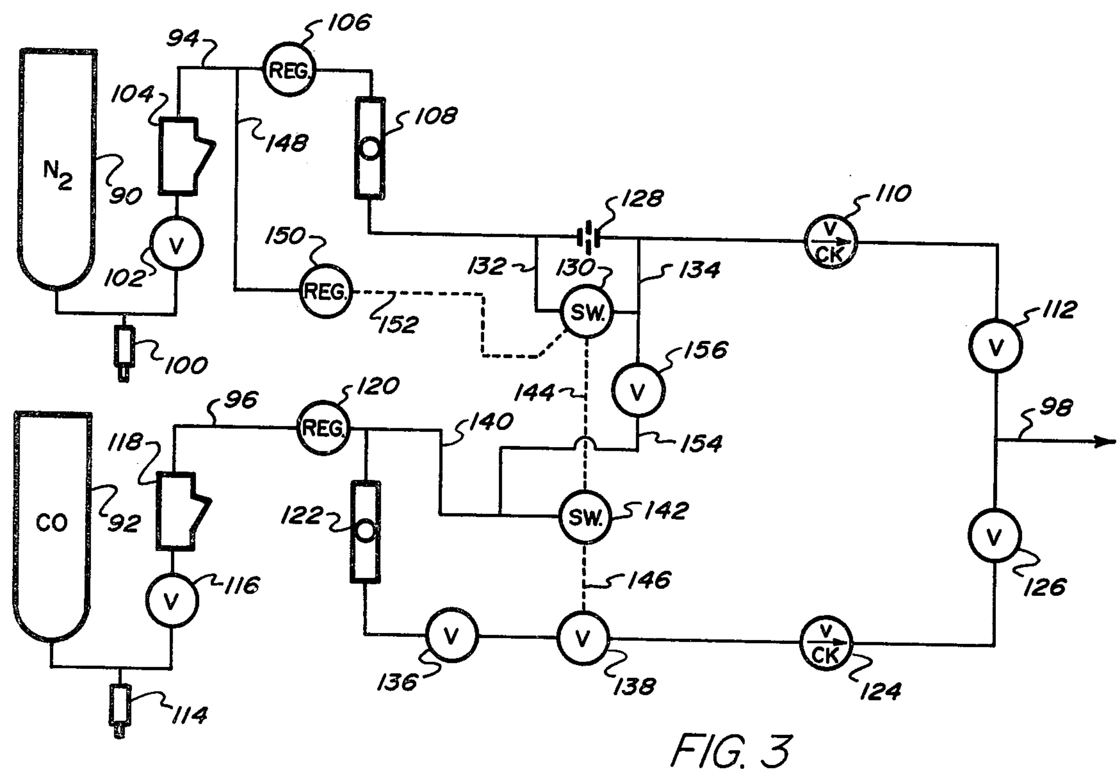
FIG. 3 is a schematic diagram of a preferred apparatus.

In FIG. 3 there is illustrated a particularly preferred apparatus in accordance with this invention. This particular apparatus can be mounted on a truck and moved about a loading facility, such as a truck terminal or railroad loading yard, to service individual food containers including truck trailers as well as railroad boxcars. Shown in this figure are nitrogen cylinder 90 and carbon monoxide cylinder 92. Connected to nitrogen cylinder 90 is nitrogen inlet line 94 and, similarly, carbon monoxide inlet line 96 is connected to carbon monoxide cylinder 92. At the ends of inlet lines 94 and 96 remote from the cylinders 90 and 92, these inlet lines are connected to a combined outlet line 98. Each of the inlet lines, 94 and 96, are provided with certain common elements and these common elements will be described first. Thus, following the flow path from nitrogen cylinder 90, nitrogen inlet line 94 is provided with a relief valve 100, a ball valve 102, a strainer 104, a pressure regulator 106, a rotameter 108, a check valve 110 and a second ball valve 112. Correspondingly in line 96, there is located a relief valve 114, a ball valve 116, a strainer 118, a pressure regulator 120, a rotometer 122, a check valve 124 and a second ball valve 126. All of the foregoing, as can be seen, are common to both nitrogen inlet line 94 and carbon monoxide inlet line 96.

Positioned in nitrogen inlet line 94 at a location intermediate rotameter 108 and check valve 110 is orifice plate assembly 128. As explained previously, this orifice plate assembly 128 is effective to measure flow rate and, in conjunction with control of upstream pressure, is effective to control flow rate. Connected across orifice plate assembly 128 is differential pressure switch 130. As shown in this figure, differential pressure switch 130 is connected to nitrogen inlet line 94 on the upstream side of orifice plate assembly 128 by means connecting line 132, while it is connected to the downstream side of assembly 128 by means of connecting line 134. Differential pressure switch 130 connected in this manner is capable of detecting any decrease in flow through orifice plate assembly 128 and of detecting a no-flow situation through assembly 128.

Carbon monoxide inlet line 96 is provided with an adjustable orifice valve 136 positioned intermediate rotameter 122 and check valve 124. In this regard, its positioning is similar to the positioning of orifice plate assembly 128 in nitrogen inlet line 94. Also located in carbon monoxide inlet line 96 is pneumatically operated valve 138, which is positioned downstream of the adjustble orifice valve 136 but upstream of check valve 124. Carbon monoxide inlet line 96 is also provided with a pressure sensing line 140 which is connected at one end thereof to carbon monoxide inlet line 96 at a point intermediate pressure regulator 120 and rotameter 122. The other end of pressure sensing line 140 is conneced to pressure switch 142.

As shown in FIG. 3, differential pressure switch 130 is connected to pressure switch 142 by means of pneumatic line 144 and pressure switch 142 is in turn connected to pneumatically operated valve 138 by means of pneumatic line 146. This interconnection of switches 130 and 142 is operable to effect the closing of valve 138 either upon detection of a decrease in flow rate or a no-flow condition across orifice assembly 128 by pressure switch 130, or upon detection of an increase in pressure upstream stream of orifice valve 136 by means of pressure sensing line 140.

Also shown in this FIG. 3, are certain preferred aspects of the appratus. Thus, it will be seen that a side stream is bled from nitrogen inlet line 94 by means of line 148 which is connected to line 94 upstream of pressure regulator 106. The side stream of nitrogen in line 148 is controlled to a desired pressure by means of pressure regulator 150, which operates to provide a source of pressure regulated "instrument air" employed in the operation of pressure switch 130, pressure switch 142 and pneumatically operated valve 138. This "instrument air," which is in fact nitrogen gas, is communicated from pressure regulator 150 to differential pressure switch 130 by means of pneumatic line 152. Thus, the gas necessary to operate the valves and switches is the inert nitrogen gas being charged to the food container thereby eliminating the need for introducing an oxygen containing gas, such as air, into the apparatus.

Another preferred aspect of this apparatus is embodied in the form of relief line 154 containing toggle valve 156. It will be seen that relief line 154 interconnects the pressure sensing line 140 (which is part of the carbon monoxide inlet line system) with downstream connecting line 134 (which is part of the nitrogen inlet line system). The purpose of this line is to relieve a pressure buildup which may have occured in carbon monoxide inlet line 96 upstream of orifice valve 136 which buildup could result in an undesired closing of valve 138. Thus, for example, the closing of ball valve 126 in inlet line 96 for purposes of servicing the apparatus or when first charging carbon monoxide to the system, could result in a build-up of back pressure which in turn could trigger pressure switch 142 keeping valve 138 in a closed position. Temporarily opening toggle valve 156 relieves this transient back pressure thereby permitting valve 138 to be maintained in the open position. This variant of the apparatus provides a further safety factor in that the carbon monoxide released from inlet line 96 when toggle valve 156 is opened in not vented to the atmosphere, which could cause an explosive mixture to be formed. Rather, the carbon monoxide being bled is introduced into the system of nitrogen inlet line 94, where it is blended with an inert gas.

What is claimed is:

1. A process for preventing the formation of a mixture of fluids in which the concentration of a first fluid is greater than a predetermined maximum, which process comprises blending a stream of the first fluid flowing at a predetermined rate with at least one inlet stream of another fluid flowing at a predetermined rate in order to form a combined stream in which the concentration of the first fluid is no greater than the predetermined maximum, sensing the flow rate of the first stream, sensing flow and the flow rate of each of the inlet streams, interrupting the flow of the first stream upon detection of an increase in the flow rate of the first stream and interrupting the flow of the first stream upon detection of a decrease in the flow rate or a no flow condition in any of the inlet streams.

2. The process of claim 1 wherein the first fluid is being introduced into a vessel and it is desired to prevent the formation of a mixture of fluids within the vessel in which the concentration of the first fluid is greater than the predetermined maximum, and wherein the formation of the combined stream by mixing the first fluid with at least one other fluid is effected externally of the vessel, and the combined stream is introduced into the vessel.

3. The process of claim 2 wherein there is only one other fluid.

4. The process of claim 3 wherein the vessel is a container for foodstuffs, the first fluid is carbon monoxide and the other fluid is nitrogen.

5. The process of claim 1 wherein the fluids are gases.

6. The process of claim 1 wherein the fluids are liquids.

7. An apparatus for blending a first fluid with at least one other fluid into a combined fluid stream for dispensing, which prevents the formation of a mixture of fluids in the combined stream in which the concentration of the first fluid is above a predetermined maximum, which apparatus comprises a first fluid inlet line, at least one other fluid inlet line, a combined fluid dispensing line with which all of the inlet lines communicate, a separate orifice means located in each inlet line, valve means associated with the first inlet line downstream of the orifice means therein and actuable to prevent flow of the first fluid through the first inlet line, means for detecting pressure within the first inlet line upstream of the orifice means and operably cooperating with the valve means to actuate the valve means upon detection of an increase in pressure, separate means associated with each of the other inlet lines for detecting pressure differential across the orifice means in each said other inlet line and operably cooperating with the valve means to actuate the valve means upon detection of a decrease in pressure differential; whereby conditions indicative of an increase in flow rate of the first fluid or a decrease in flow rate of any of the other fluids are effective to prevent flow of the first fluid through the first inlet line.

8. The apparatus of claim 7 wherein there are a plurality of other fluid inlet lines.

9. The apparatus of claim 7 wherein the first fluid inlet line is provided with pressure regulating means at a point upstream of the means for detecting pressure within said line and each of the other fluid inlet lines is provided with a pressure regulating means upstream of the separate means for detecting pressure differential across the orifice means in each of said other inlet lines.

10. The apparatus of claim 7 wherein the valve means associated with the first inlet line is actuable by fluid pressure and the fluid to actuate said valve is obtained as a sidestream from one of the other fluid inlet lines.

* * * * *